July 28, 1959

C. A. PACKARD

2,897,416

ELECTROMAGNETIC DEVICES

Filed Jan. 24, 1958

C. A. PACKARD 2,897,416

ELECTROMAGNETIC DEVICES

Filed Jan. 24, 1958

July 28, 1959  C. A. PACKARD  2,897,416
ELECTROMAGNETIC DEVICES
Filed Jan. 24, 1958  5 Sheets-Sheet 4

United States Patent Office
2,897,416
Patented July 28, 1959

2,897,416

ELECTROMAGNETIC DEVICES

Charles A. Packard, Welaka, Fla.

Application January 24, 1958, Serial No. 710,955

16 Claims. (Cl. 317—195)

This invention relates to electromagnetic devices having pivotally mounted armatures whose motion is utilized to actuate electrical contacts or other controlled elements such as valves and the like.

In accordance with the present invention, two or more armatures are pivotally mounted to rotate in the same direction about their respective pivotal axes in response to excitation of a field coil and are each provided with a pair of curved surfaces which respectively engage the curved surface of an adjacent one of the armatures. More specifically and preferably, each pair of engaging surfaces has constant radii of curvature which may be the same as, or different from, the constant radii of curvature of the other pair of engaging surfaces. In all cases, the engaging surfaces of adjacent armatures have at each point of contact radii of curvature whose algebraic sum is equal to the spacing of the pivotal axes of those armatures and the radii from the pivotal axes of the adjacent armatures to the centers of curvature of their engaging surfaces are parallel. In consequence, in their response to excitation of the field coil, or to a restoring force, all armatures are constrained by their mutually engageable surfaces to move at substantially the same angular velocity for efficient conversion of the accelerating field to mechanical torque of the armature system as a whole and for synchronized movement of the individual armatures.

Additionally in arrangements utilizing a further aspect of the invention, all armatures of the device are of the same configuration and symmetrically disposed about the common pole member whereby the engaging curved surfaces of the armatures preclude change in their relative position when the device is subjected to shock or vibration. More specifically and with armatures having engaging surfaces of fixed radii of curvature, the arcuate surfaces of each armature have centers of curvature which lie on a circle whose center is at the pivotal axis of the armature and with angular spacing substantially equal to $$\frac{360°}{n}$$

where $n$ is the number of armatures or pivotal axes.

The invention further resides in electromagnetic devices having features of construction, combination and arrangement hereinafter described and claimed.

For a more complete understanding of the invention, reference is made in the following description to various exemplary embodiments of the accompanying drawings in which:

Figs. 1A and 1B illustrate a two-armature arrangement with the armatures respectively in their unattracted and fully attracted positions;

Fig. 1C, in perspective, illustrates an electromagnetic relay device incorporating the armature system of Figs. 1A and 1B;

Referring to Figs. 1A–1C, the electromagnetic device 10A comprises a stationary magnetic structure 11A having a core member 12A, an exciting winding 13A and a movable armature system comprising a pair of pivotally mounted armatures 14A, 14A. In this modification, the stationary magnetic field structure is of the E-type with the exciting winding disposed about the central leg or core. The armatures are respectively pivotally mounted upon or adjacent the outer legs of the field structure for movement in a plane substantially normal to the upper end or pole of core member 12A.

Each of the armatures 14A has a pair of curved surfaces 16, 17 respectively disposed on opposite sides of the pivotal axis P of the armature. The curved surface 16 of each armature is engageable by the curved surface 17 of the other armature for all angular positions of the armatures about their respective pivotal axes within their permitted limits of movement toward and from the pole member 12A. As indicated, the sum of the radii of each engaging pair of arcuate surfaces 16, 17 is equal to the fixed distance between the spaced pivotal axes P, P of the armatures.

As shown in Figs. 1A–1C, the armatures are of substantially identical configuration and the curved surfaces 16, 17 of each armature are arcs having their centers of curvature C16, C17 equally distant from the pivotal axis P of that armature and lie on a line passing through the pivotal axis P. In other words, in this arrangement the centers of curvature C16, C17 lie on a circle having its center at the pivotal axis and the angular spacing of the centers C16, C17 is 180°.

First assuming that the armatures 14A are in the "out" or unattracted position shown in Fig. 1A and that winding 13A remains deenergized, the armatures remain in such position despite shock or vibration in any direction or plane for the reason that the armatures, whether or not individually balanced, tend under such circumstance to rotate in opposite directions about their respective axes but are prevented from doing so by the engagement between the pairs of arcuate surfaces 16, 17 of the two armatures.

When, however, the winding 13A is energized, the magnetic force exerted by pole element 12A tends to move both armatures in a counterclockwise direction, each about its pivot P (Fig. 1A). In their response to such force, neither armature can move to any appreciable extent independently of the other because of the interengagement of their curved surfaces 16, 17, with the result that both armatures are constrained to move at substantially the same angular velocity toward their "in" or fully attracted position (Fig. 1B). Such similar response of the armatures to the magnetizing field is enforced despite any differences between the pivotal frictions or mass distribution of the armatures, between the reluctances or change in reluctance, of the respective magnetic circuits of the armatures, or between any working loads imposed on the individual armatures. In effect, the armatures have the same sensitivity despite any such differences as may exist.

Since the armatures are of the same induced magnetic polarity, the engagement of their pairs of curved surfaces 16, 17 does not impose any magnetic drag or braking effect. In fact, in absence of any external effect, such as shock or vibration, tending to cause the attracted armature to move at different angular velocities, the sliding engagement between the surfaces 16, 17 of the two armatures need not produce any appreciable friction or braking effect. If, however, and for any reason, one armature tends to rotate faster than the other in the same angular direction, it applies through its curved surfaces 16, 17 an accelerating force to the other armature. In other words, as the armatures are accelerated by the magnetic field of pole 12A from the position of Fig. 1A to that of Fig. 1B, the successive incremental movements of one armature are essentially equal to those of the other armature.

In absence of any continuous restoring force—such as supplied by biasing spring means—the armatures will remain in the "in" position shown in Fig. 1B after winding 13A is deenergized and will maintain such position despite shock or vibration because of the interengagement of their pairs of curved surfaces 16, 17. To return the armatures to their "out" position (Fig. 1A), a restoring force may be temporarily applied to rotate both armatures in clockwise direction about their respective pivotal axes P. Such resetting of the armature system may, as in the arrangement shown in Fig. 1C, be effected by momentarily depressing a reset knob 18 which may be normally biased, as by spring 19, to its inactive position. If either or both of the armatures are biased, as by spring means not shown, to the "out" position (Fig. 1A), they will be returned by the continuously applied restoring force of such spring means to that position upon deenergization of winding 13A.

In all cases, both armatures are forced, during their return movement, to rotate at the same angular velocity in a clockwise direction about their respective axes because of the interengagement of the curved surfaces 16, 17 of one armature with the curved surfaces 17, 16 respectively of the other armature.

Such interdependence of the positions of the armatures 14A, 14A at all times, in addition to the aforesaid advantages of immunity to shock or vibration and efficient conversion of the magnetic field to mechanical motion, also permits the armatures to be individually used for actuation of electrical contacts or other control elements with assurance that such elements will always operate in predetermined sequence.

In the particular arrangement shown in Fig. 1C, the switch 20A is controlled by cam 21A rotatable with one of the armatures and the switch 20B is controlled by cam 21B rotatable with the other of the armatures. The cams or switches may be so designed or adjusted that the switches open or closed for different angular positions of the respective armatures and the interengagement of the arcuate surfaces 16, 17 of the armatures insures that such timing or phasing will be maintained. Thus, the total load imposed upon the armature system of device 10A by its switches, or other control elements, may be distributed among the different armatures without impairment of the timing of the switches.

The pole-opposing faces of the armatures may be shaped to optimize the magnetic pull exerted by the pole member upon the armatures. In the simple configuration shown in Fig. 1A, the flux from the narrower sides of the pole-piece 12A to the aramature arms 22A tends to rotate the armature in clockwise direction in opposition to the greater magnetic pull exerted by the wider sides of the pole-piece upon the armature arms 23A. The initial attractive force effective to produce the desired counterclockwise rotation of the armatures is therefore the difference of these two opposing forces.

Figures 2A, 2B:
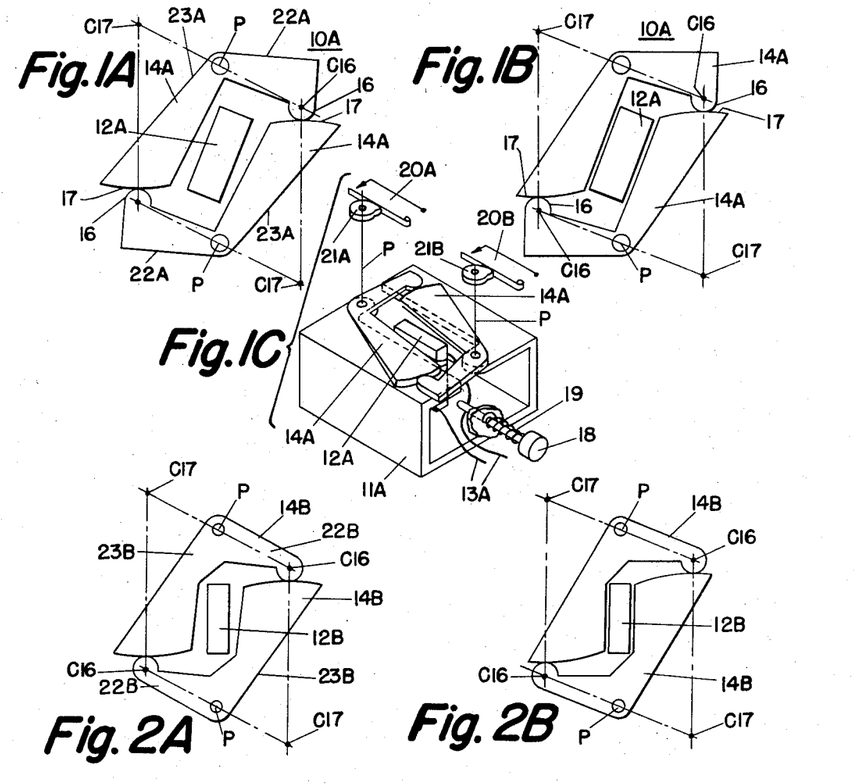
Figs. 2A and 2B illustrate a modification of Figs. 1A and 1B.

By re-shaping the pole-opposing surfaces of the armatures, and re-locating the pivotal axes the pull on the arms 22A may be substantially reduced. For example, in the two-armature arrangement shown in Fig. 2A, the pivotal axes P, P are so located and the pole-opposing faces of the arms 23B of the armatures 14B are so shaped that the flux from the narrower faces of the pole 12A, as well as that from its wider faces, is effective to rotate the armatures in counterclockwise direction toward the fully attracted position (Fig. 2B). In other respects the armature system of Figs. 2A and 2B is similar to that of Figs. 1A–1C. Accordingly, and for brevity here, it shall be understood, the foregoing description of Figs. 1A–1C concerning the interdependence of the positions of the armatures of Figs. 1A–1C is also applicable to Figs. 2A–2B, and need not be repeated. In fact, such description is generally applicable to all of the armature arrangements herein disclosed and is not repeated in detail. In all modifications, the corresponding elements are identified by similar reference characters with letter suffixes individual to the respective modifications.

Figure 3A:
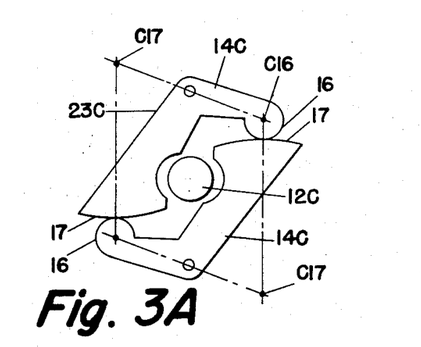
Figs. 3A and 3B illustrate another modification of Figs. 1A and 1B with the armatures shaped for cooperation with a pole member of circular cross-section.
Figure 3B:
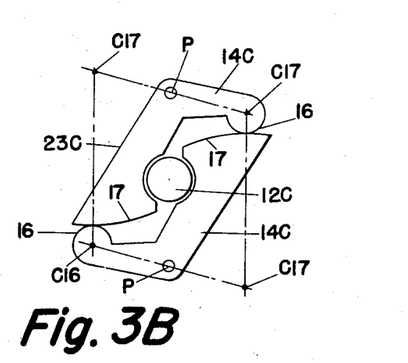

The armature arrangement shown in Figs. 3A and 3B is similar to that of the preceding figures in the two armatures 14C each have convex arcuate surfaces 16, 17 which respectively engage the arcuate surfaces 17, 16 of the other armature to effect such interdependence of the concurrent positions of the armatures that they are insensitive to shock and vibration and are constrained to move at substantially the same angular velocity in the same angular direction about their respective pivotal axes both when moved from the position of Fig. 3A to that of Fig. 3B by the attraction of pole member 12C and when moved back to the "out" position of Fig. 3A by a restoring or resetting force. The armature arrangement of Figs. 3A and 3B is also similar to that of Figs. 2A and 2B in that substantially all of the flux from the pole-piece is utilized to effect counterclockwise movement of the armatures and that little, if any, of such flux produces an opposing torque.

In the arrangement shown in Figs. 3A and 3B, the pole member 12C is of circular cross-section and the pole-opposing faces of the armatures are correspondingly complementarily shaped to conform with the pole outline when the armatures are in their fully attracted position (Fig. 3B). As in all of the armature systems herein disclosed, the pole-opposing faces of the armature jointly embrace a predominantly large part of the perimeter of the pole element.

In all of the armature arrangements previously described, both of the arcuate surfaces 16, 17 of each armature are convex and the arithmetic sum of their radii of curvature is equal to the distance between the pivotal axes P, P of the armatures. In the armature arrangement shown in Figs. 4A–4B, the interdependence of the concurrent positions of the two armatures 14D, 14D is maintained by engagement between a convex surface 16 of each armature with a concave surface 17 of the other armature. However, in this modification, the arithmetic difference in length of the radii of the arcuate surfaces, rather than the arithmetic sum of such radii, is equal to the distance between the pivotal axes of the armatures. Thus, for all arrangements, including those hereinafter described, the algebraic sum of the radii of curvature of each pair of engaging surfaces 16, 17 is equal to the distance between the pivotal axes of the corresponding armatures.

Figure 4A:
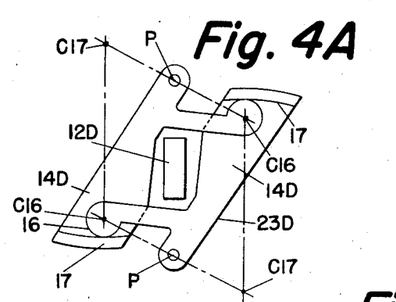
Figs. 4A and 4B are illustrative of another modification of Figs. 1A and 1B.
Figure 4B:
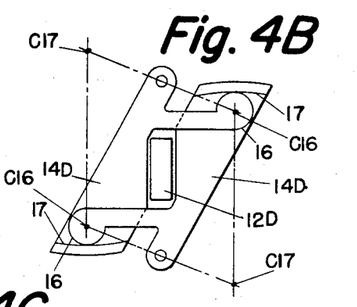
Figures 4C, 5A, 5B, 5C, 6A, 6B:
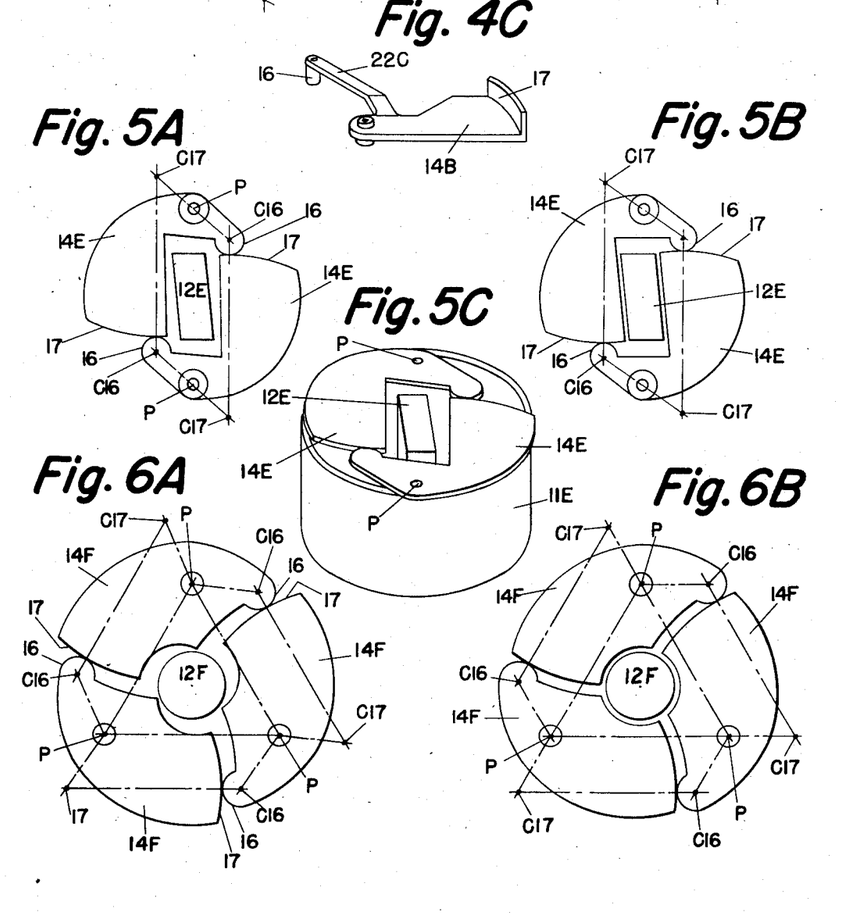
Fig. 4C is a perspective view of one of the armatures of Figs. 4A and 4B.
Figs. 5A and 5B illustrate another two-armature arrangement in which the armatures are shaped for cooperation with a cylindrical field structure.
Fig. 5C is a perspective view of the armature and field structure of Figs. 5A and 5B.
Figs. 6A and 6B are illustrative of a three-armature arrangement and respectively show the armatures in their unattracted and fully attracted positions.

In the particular construction shown in Figs. 4A, 4B and 4C, the roller or pin providing the convex surface 16 is carried by an arm 22C which is vertically offset to avoid any interference with the arm 23D of the other armature. As assembled, the pin or roller 16 carried by the offset arm of one armature engages the concave surface 17 provided by the upstanding flange of the arm 23D of the other armature.

The armature arrangement of Figs. 4A–4C, like those of Figs. 2A–2B and Figs. 3A–3B, may be included in a complete device similar to that of Fig. 1C for actuation of switches or other control devices with like immunity to shock and vibration, with efficient conversion of the magnetic force to mechanical torque, and with assurance that the armatures shall move at substantially the same angular velocity when moved by the magnetic attraction of the pole member and when moved in the opposite direction by a restoring force.

Figs. 5A–5C disclose another two-armature arrangement in which the armatures 14E, 14E have curved surfaces 16, 17 cooperating to maintain the armatures stably in position at their limits of travel and to enforce their synchronized movement in the same direction about their respective axes when moved from either limit to the other. In this modification, the stationary structure 11E providing the external return path for the magnetic flux is a pot or housing completely encasing the exciting winding disposed about the pole element or core 12E. As indicated, the pole-opposing faces of the armature elements are shaped for effective utilization of the flux from the pole member 12E in the working gaps and outer portions of the armature elements are shaped to overlie the rim of the housing 11E to attain low reluctance of the flux return path.

The two armatures 14E are of substantially identical construction and, as in the previously described arrangements, the centers of curvature C16, C17 of the arcuate surfaces 16, 17 are spaced 180° about the pivotal axis of the corresponding armature and the sum of the radii of curvature of the surfaces 16, 17 is substantially equal to the distance between the pivotal axes P, P of adjacent armatures.

Figure 9A:
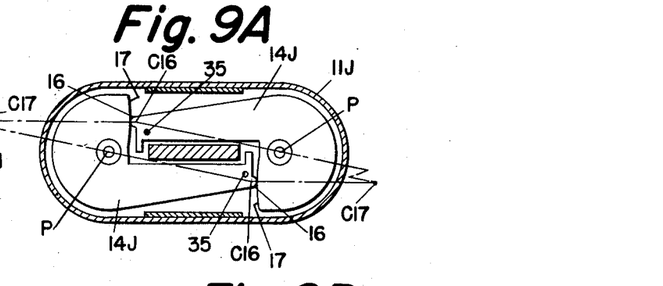
Fig. 9A illustrates a modification of the armature arrangement shown in Figs. 8A and 8B.
Figure 9B:
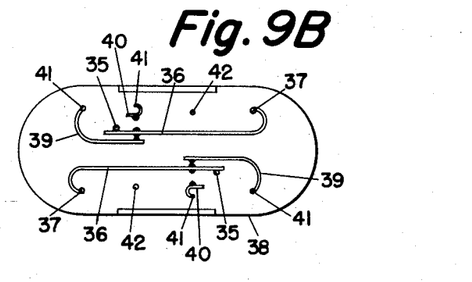
Fig. 9B is a contact deck suited for the construction shown in Fig. 9A and equivalents thereof.

The motion of the armatures 14E, 14E may be utilized in any suitable arrangement, including those shown in Figs. 1C and 9B, to actuate switches or other control devices.

The three-armature arrangement shown in Figs. 6A, 6B also provides for insensitivity of the armature system, and of auxiliary devices controlled thereby, to shock and vibration and insures like incremental changes in position of the armatures in their response to applied magnetic or restoring forces. The three pivotal axes P of the three armatures 14F are equally spaced from one another and are symmetrically disposed about the circular pole member 12F. The centers of curvature C16, C17 of the curved surfaces 16, 17 of each armature lie on a circle having its center at the pivotal axis P of the armature and are angularly spaced 120°. The sum of the radii of curvature of the surfaces 16, 17 is equal to the pivotal spacing. When the armatures are assembled in an electromagnetic device to form its armature system, the curved surface 16 of each armature 14F engages the curved surface 17 of one of its adjacent armatures and its curved surface 17 engages the curved surface 16 of its other adjacent armature.

Thus, as above explained in connection with the two-armature system, the symmetrical three-armature system of Figs. 6A, 6B efficiently utilizes the magnetic field to effect concurrent movement of all of the armatures at substantially the same angular velocity and is immune to any force, such as shock or vibration, which does not tend concurrently to move all armatures in the same angular direction about their respective pivots. When the pole element 12F is excited by energization of the associated winding, all armatures 14F are attracted thereto to rotate in counterclockwise direction from the "out" position shown in Fig. 6A toward the "in" position shown in Fig. 6B and are forced to move at substantially the same angular velocity by the mutual interaction of the arcuate surfaces 16, 17 of each armature upon the other two armatures of the system. For like reason, when a restoring force is applied, all three armatures are constrained to move with like incremental angular velocity in clockwise direction from the position shown in Fig. 6B to the original position shown in Fig. 6A.

Figures 7A, 7B, 11A, 11B:
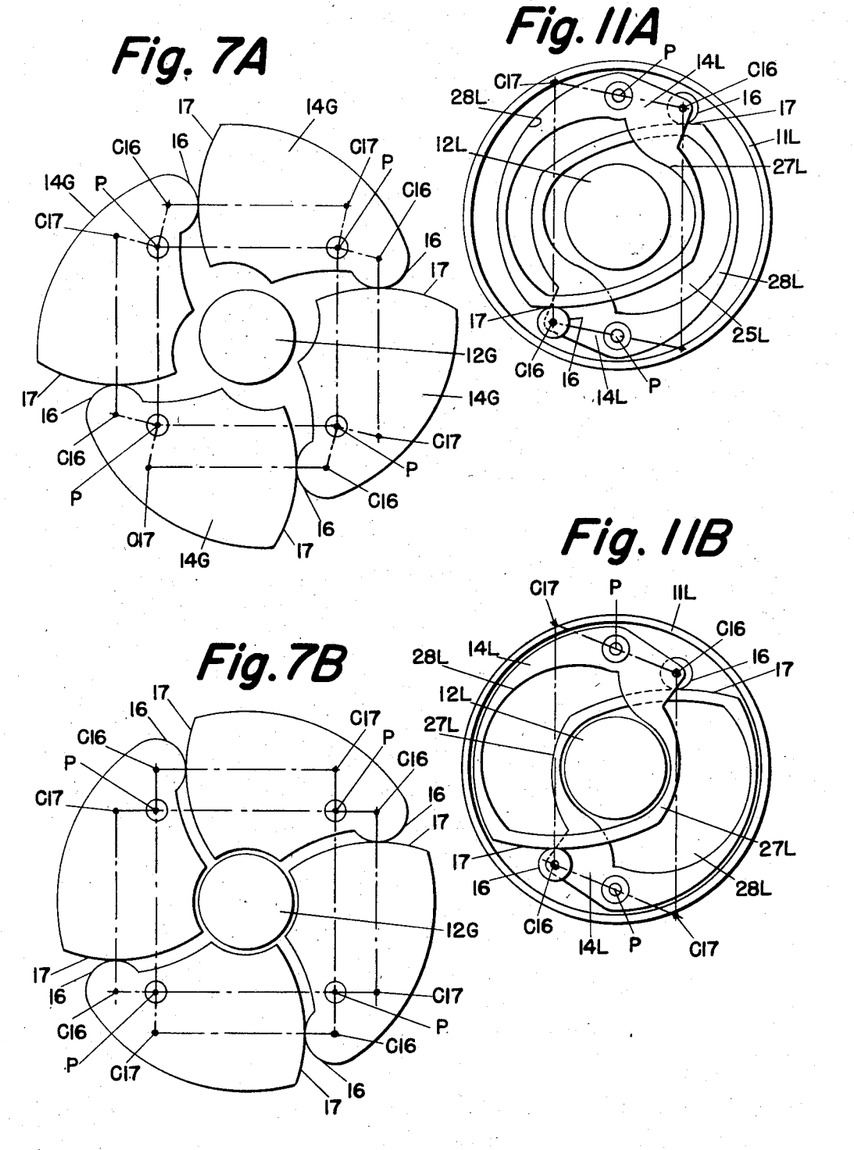
Figs. 7A and 7B are illustrative of a four-armature arrangement and respectively show the armatures in their unattracted and fully attracted positions.
Figs. 11A and 11B illustrate another two-armature arrangement in which the pole member is of circular cross-section and the return field structure is of cylindrical cross-section.

The symmetrical four-armature arrangement shown in Figs. 7A, 7B also achieves both insensitivity of the armature system to shock and vibration and positional interdependence of the armatures when subjected to either an applied magnetic field or a restoring force tending to move all of them in the same angular direction about their respective pivotal axes. Considering each adjacent pair of armatures 14G, the radius of the arcuate surface 17 of one armature plus the radius of the engaging arcuate surface 16 of the other armature is equal to the spacing between the pivotal axes of those armatures. In the symmetrical four-armature arrangement shown, the pivotal axes P are all equally spaced with respect to each other so that all arcuate surfaces 16 have the same radius of curvature and all arcuate surfaces 17 have the same radius of curvature.

The pole-opposing faces of the armatures 14G are shaped substantially to conform with and to embrace substantially the whole periphery of the circular pole element 12G when the armatures are in their fully attracted position (Fig. 7B). The outer portions of the armatures 14G, as shown in Figs. 7A, 7B, are shaped to provide low reluctance of the non-working gaps between them and a cylindrical magnetic housing such as shown in Fig. 5C.

It is to be noted that with the four-armature symmetrical arrangement (Figs. 7A, 7B), the angular spacing of the centers of curvature C16, C17 with respect to the pivotal axis P of the associated armature is 90°, instead of 120° as for the three-armature symmetrical arrangement (Figs. 6A, 6B), or 180° as for the two-armature symmetrical arrangement (Figs. 1A–5B).

It can be similarly shown that the invention is applicable to armature systems having more than four armatures with mutually cooperative arcuate surfaces 16, 17. In general, for any armature system having two or more armatures, the following relationships should obtain: (1) the algebraic sum of the radii of curvature of the interengaging surfaces 16, 17 of any two adjacent armatures shall be substantially equal to the distance between the pivotal axes of those armatures; (2) the radius P—C17 from the pivotal axis of each armature to the center of curvature of its arcuate surface 17 shall be substantially parallel to the radius P—C16 from the pivotal axis of the adjacent armature to the center of curvature of the arcuate surface 16 of such adjacent armature; (3) the radii of the interengaging arcuate surfaces 16, 17 at their point of engagement shall define a line C16—C17 parallel to the line P, P between the pivotal axes of the two corresponding armatures. When it is additionally required that the armature sysem shall be immune to shock and vibration, such characteristic may most readily be attained by providing that: the armatures shall be similar; the centers of curvature of the arcuate surfaces 16, 17 of the individual armatures shall lie on a circle whose center is the pivotal axis of that armature; and the angular spacing of the centers of curvature C16, C17 of an individual armature with respect to its pivotal axis shall be substantially equal to $$\frac{360°}{n}$$

where $n$ is the number of armatures or pivotal axes of the armature system.

Figure 8A:
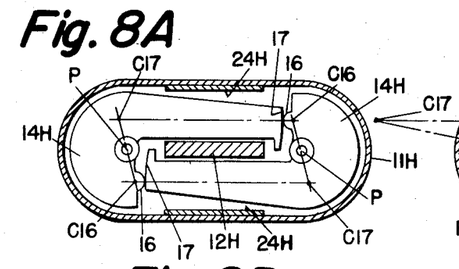
Fig. 8A illustrates another two-armature arrangement with the armatures in their fully attracted position.
Figure 8B:
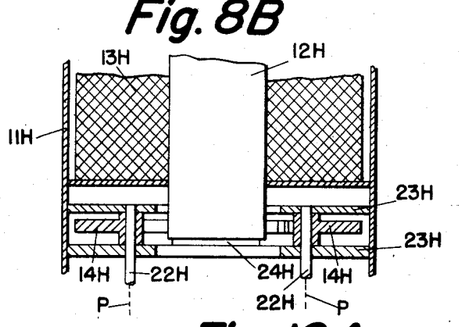
Fig. 8B is a sectional view in side elevation taken on line 8B—8B of Fig. 8A.

Referring to Figs. 8A and 8B, the two armatures 14H are respectively rotatable about pivotal axes P provided by the shafts 22H. The spacing between the pivotal axes is maintained by mounting plates 23H which may be joined by straps 24H to provide a sub-assembly including the mounted armatures. At least the upper plate is provided with an opening to pass the pole element 12H. When, as is desirable, mounting plates 23H are of iron or other magnetic material, the opening should be sufficiently large to provide a non-working gap between the plate and pole 12H which exceeds the working air gap from the pole 12H and each unattracted armature. The outer periphery of plates 23H are each shaped to fit the housing 11H which encloses the winding 13H and to provide return paths for the magnetic flux.

The outer ends of the armatures 14H are each shaped and dimensioned to provide a short air gap of large cross-sectional area to the housing 11H so to minimize the reluctance of this non-working portion of the magnetic circuit: in this gap, the magnetic pull is radial and so does not tend to rotate the armature in either direction. When either or both of the mounting plates 23H are of magnetic material, their indicated overlap of each of the armatures 14H also decreases the reluctance of its flux return path.

As indicated, the distance from the center of curvature C16 of surface 16 of one armature to the center of curvature C17 of the engaging surface 17 of the other armature is equal to the distance between the pivotal axes of the mounted armatures. The armatures are of identical configuration and accordingly the centers of curvature C16, C17 of the arcuate surfaces 16, 17 of each armature are equally distant from the pivotal axis P of that armature and are angularly spaced 180° on a circle having its center at the pivotal axis. As above discussed, there is thus obtained the positional interdependence of the armatures providing both efficient utilization of the magnetic field and immunity to shock and vibration.

The armature arrangement shown in Fig. 9A is quite similar to that of Figs. 8A, 8B so far as the general configuration of the armatures is concerned. It is to be noted, however, that for each armature 14J of Fig. 9A, the arcuate surface 16 having the smaller radius of curvature is more remote from the pivotal axis P of that armature than its arcuate surface 17 having the larger radius of curvature, whereas for each armature 14H of Fig. 8A, the arcuate surface 17 having the larger radius of curvature is the more remote from the pivotal axis of that armature. Consistently with such difference, the circle of the centers of curvature C16, C17 of Fig. 9A is of much greater diameter than the circle of the centers of curvature C16, C17 of Fig. 8A. Again, however, in both Figs. 8A and 9A, the sum of the radii of the arcuate surfaces 16, 17 to their centers of curvature is equal to the spacing of the pivotal axes of the armatures.

The pins 35, 35 extending from the armatures 14J, 14J are for actuating the leaf-spring contacts 36, 36 (Fig. 9B) extending from terminal posts 37, 37 of the contact deck 38. The pairs of fixed contacts 39, 40 are supported by terminal posts 41 of the deck 38. This particular contact-arrangement therefore affords two singlepole double-throw switches. The other pair of terminal posts 42, 42 of the deck are for connection to the relay coil. The armatures of the other arrangements herein disclosed may similarly be provided with pins for direct actuation of contacts mounted on a contact deck disposed adjacent the armature system within the housing for the coil and armature assembly.

Referring to Figs. 10A–10D, the individual armatures 14K are each formed by stamping and bending to provide two spaced sections joined along one edge by the integral web pieces 24K, and each having an opening 25K through which the polepiece 12K extends. A roller or pin 26K disposed between the two spaced plates of each armature provides its arcuate surface 16. As assembled on their respective pivots 22K, the armatures 14K are interleaved with the periphery of pin 26K of each armature engaging the arcuate outer edge surface 17 of the other armature.

Figure 10A:
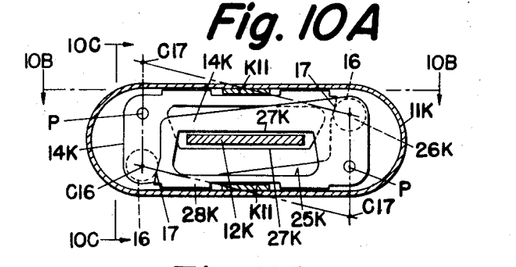
Fig. 10A illustrates another two-armature arrangement.

As indicated in Fig. 10A, the sum of the radii of the arcuate surfaces 16, 17 is substantially equal to the center-to-center spacing of the armature shafts 22K and the centers of curvature C16, C17 of the arcuate surfaces 16, 17 of each armature are equally distant from the pivotal axis of that armature on a line of centers through the pivotal axis P of the armature. There is thus provided, as explained in discussion of previous figures, the positional interdependence of the armatures which makes the armature system insensitive to shock and vibration and which insures synchronized movement of the armatures in response to an applied magnetic field or restoring force.

Figure 10B:
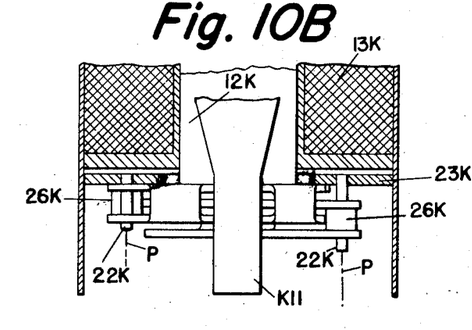
Fig. 10B is a sectional view in side elevation taken on line 10B—10B of Fig. 10A.
Figure 10C:
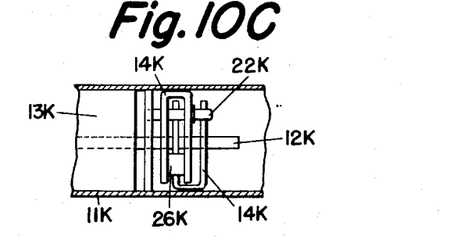
Fig. 10C is an end elevational view in section taken on line 10C—10C of Fig. 10A.
Figure 10D:
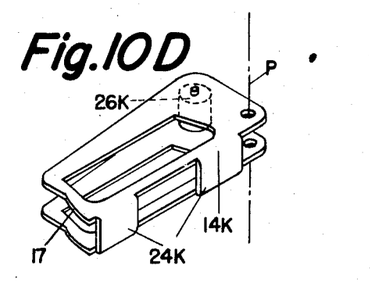
Fig. 10D is a perspective view of one of the armatures of Figs. 10A–10C.

From inspection of Fig. 10A, it is evident that each armature is attracted to the position there shown, both by the magnetic field between the pole-piece 12K and the more adjacent armature portion 27K and by the attraction of the opposite web bed portion 28K of the armature toward the external field structure K11 and 11K. Each armature therefore has four working air gaps effective upon energization of coil 13K to move that armature toward the position shown in Fig. 10A. During such movement, the cooperation between the curved surfaces 16, 17 of the two armatures insures that the four working gaps of both armatures close at the same angular rate. The armature construction shown in Figs. 10A–10C provides very efficient utilization of the field produced by the exciting winding. As indicative of such advantage of this armature arrangement, it is noted that with only 1.4 watts input to the coil, it met size and contact-actuating requirements which could not be met by a relay of conventional armature construction with a coil input of 9 watts.

The same type of armature construction, modified for circular configuration of the pole-piece and external field structure, is shown in Figs. 11A and 11B. Each armature 14L has a large opening 25L through which the pole-piece extends. The inner surface of armature portion 27L bounding one side of the opening 25L is concave to conform with the periphery of the pole-piece 12L, and the outer surface of armature portion 28L bounding the opposite side of opening 25L is curved to conform with the inner periphery of the outer pole member or housing 11L.

With the armatures in the deenergized position shown in Fig. 11A, each armature therefore has two working gaps, one between its portion 27L and the central pole-piece 12L and the other between its portion 28L and the external field structure 11L. The magnetic pulls in these gaps both tend to effect clockwise rotation of each armature about its pivot P. Furthermore, since the armatures are symmetrically disposed on opposite sides of the pole-piece 12L, the flux initially divides substantially equally between both armatures. Such equality of flux distribution is maintained as the armatures move toward their fully attracted position (Fig. 11B) because of the substantial equality of their successive increments of movement as enforced by the cooperation of the mutually-engaging armature surfaces 16, 17.

Briefly, the radius of curvature of arcuate surface 17 of each armature 14L plus the radius of curvature of the engaging arcuate surface 16 of the other armature 14L is equal to the distance between the pivotal axes P, P of the armatures. Also, the centers of curvature C16, C17 for the arcuate surfaces 16, 17 of each armature 14L are equally distant from the pivotal axis P of that armature and lie on a line through that pivotal axis.

Figures 12A, 12B, 12C, 12D, 12E, 12F, 13:
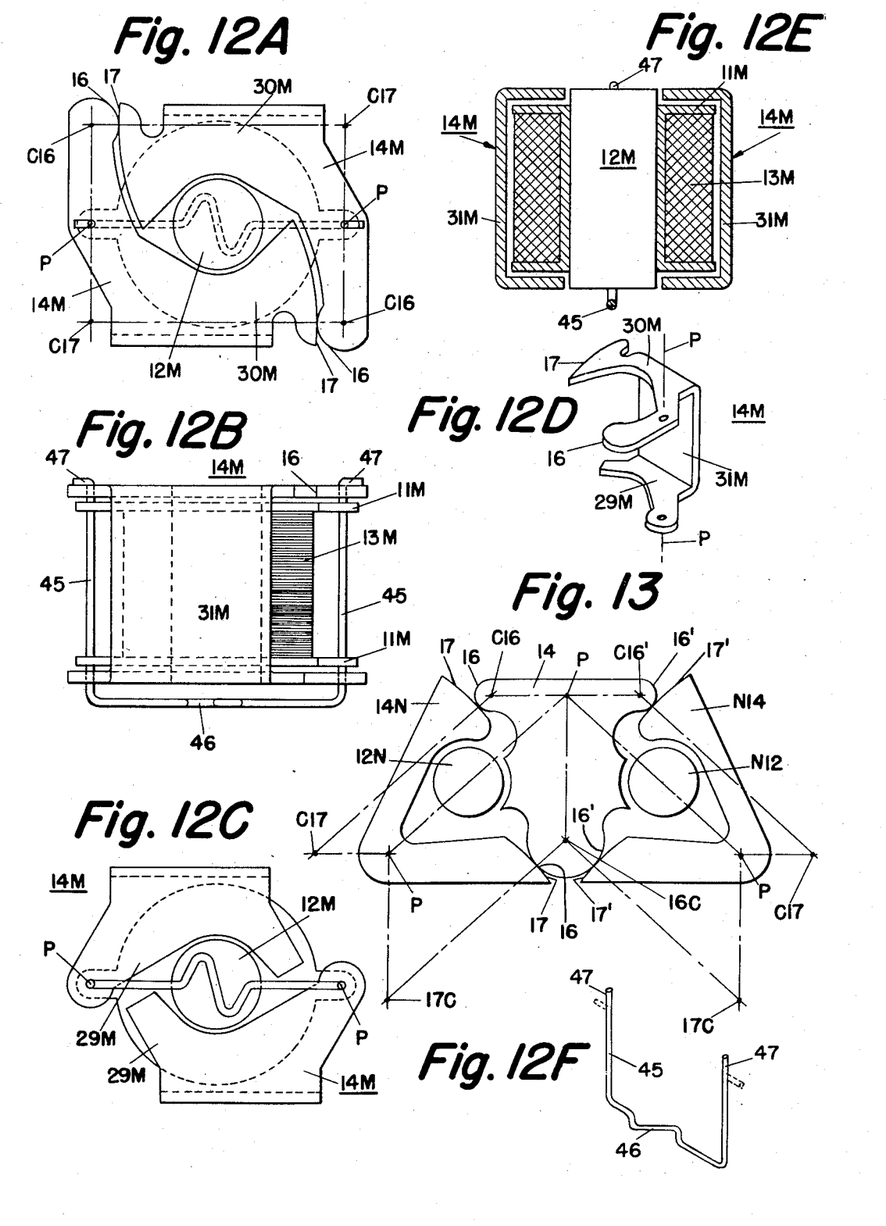
Figs. 12A–12C are bottom, side elevational and top views respectively of a two-armature arrangement in which the armatures provide a path for the return flux.
Fig. 12D is a perspective view of one of the armatures of Figs. 12A–12C.
Fig. 12E is a sectional view showing a combined biasing spring and pivot construction for the armatures of Figs. 12A–12C.
Fig. 12F is a perspective view of the bias and pivot spring of Fig. 12E.
Fig. 13 illustrates a three-armature, two-pole arrangement.

The modification shown in Figs. 12A, 12B is essentially similar to those previously described insofar as the positional interdependence of the armatures is concerned. It differs therefrom in that the armatures 14M also provide return paths for all, or substantially all, of the magnetic flux of the exciting winding 13M. As best shown in Fig. 12D, each armature structure 14M comprises two spaced armatures 29M, 30M joined by a bridging section 31M. As assembled on their pivots, the two upper armature sections of the armatures 14M are attracted by the upper pole or end of core member 12M (Fig. 12C) and the two lower sections of the armatures are attracted by the lower end or pole of core member 12M (Fig. 12A). The bridging sections 31 of the armatures embrace the winding 13M on pole member 12M and so jointly provide a movable external path for the magnetic flux from and back to the opposite ends of the fixed pole member 12M through the working gaps and the armature sections 29M, 30M.

The pole-opposing faces of the upper armature sections 29M are shaped to conform with the circular shape of the upper end or pole of core member 12M. The pole-opposing faces of the lower armature sections 30M are shaped to conform with the outline of the lower end or pole of the core member 12M. In addition, the lower armature sections 30M are also each provided with arcuate surfaces 16, 17 respectively engageable by the arcuate surfaces 17, 16 of the other armature to provide, as in the previously described modifications, a positional interdependence of the two armatures which, inter alia, results in immunity to shock and vibration.

As shown in Fig. 12A, the radius of curvature of the arcuate surface 17 of each armature 30M plus the radius of the engaging arcuate surface 16 of the other armature 30M is equal to the spacing of the pivotal axes P, P of the two armatures. The armature sections 30M, 30M are identical, and hence for each of them the centers of curvature C16, C17 of its arcuate surfaces 16, 17 define the diameter of a circle having its center coincident with the pivotal axis P of that armature.

It shall be understood that all of the armature systems herein described may, as schematically illustrated in Figs. 1C and 9B, be used to actuate the movable structure of one or more switches or other control devices, and that all of the armature systems described may be subjected to a continuous restoring force effective to reset the armatures upon deenergization of the exciting winding, or may be reset by a temporarily-applied restoring force, in which latter event the exciting winding need be only momentarily energized.

As shown in Fig. 12E, the two armatures may be biased to their unattracted position and also pivotally supported by a torsion spring 45. As shown in Fig. 12F, the spring is a length of round wire bent into a U shape with the spacing between the legs corresponding with the spacing of the pivotal axes of the armatures. To facilitate assembly, the base of the U may include an integral section 46 bent into a hair-pin, coil or zig-zag shape. The legs of the U spring, as shown in Fig. 12E, are passed through aligned holes in the frame members 11M and the armatures 14M to serve as pivots for the armatures. The projecting ends of the legs of the spring are then bent to form ears 47 which are attached, as by welding to the respective armatures while held in or somewhat beyond their normal unattracted position. This combined bias and pivot construction, also suited for all of the other two armature arrangements, provides an inexpensive pivotal mounting for the armatures and also provides equal biases for them without difficulties experienced with separate biasing springs.

In the armature arrangements shown in Fig. 13, and when the exciting coil for pole member 12N is energized, the armatures 14 and 14N are attracted by that pole member and both swing in clockwise direction about their respective pivotal axes. During each movement, the armatures 14, 14N are forced to move at substantially the same angular rate by the engagement of the arcuate surfaces 16 of armature 14 with the arcuate surfaces 17 of armature 14N in manner similar to that described in connection with previous figures of drawing.

In the particular arrangement shown in Fig. 13, unlike the symmetrical arrangements herein previously described, the radii of curvature of the arcuate surfaces 17 are not equal to each other, nor are the radii of curvature of the arcuate surfaces 16. However, the sum of the radii of curvature of each pair of engaging surfaces 16, 17 of armatures 14, 14N is equal to the distance between the pivotal axes of those armatures so that as in the other disclosed arrangements, the two armatures must rotate about their respective pivotal axes in the same direction and at the same rate when subjected to a restoring force or to the applied magnetic field. It is also to be noted that the radius C17–P from the pivot P of armature 14N to the center of curvature C17 of its upper arcuate surface 17 is always parallel to the radius C16–P from the pivot P of armature 14 to the center of curvature C16 of its upper arcuate surface 16: likewise, the radius 17C–P from the pivot of armature 14N to the center of curvature 17C of its lower arcuate surface 17 is always parallel to the radius 16C–P from the pivot of armature 14 to the center of curvature 16C of its lower arcuate surface 16.

Thus, there exists the geometrical relationships essential to effecting concurrent equal angular movements of these armatures when pole 12N is excited to attract them. In this respect, the armatures 14, 14N directly coact as in the previously described two-armature systems. However, unlike in the previously described two-armature arrangements, the armatures 14, 14N are not similar and do not mutually coact to balance out torques induced by shock or vibration. Such arrangement, however, is well suited for many applications in environments where there is little or no need for immunity to shock or vibration but where effective conversion of the magnetic field into synchronized movement of the armatures is of advantage.

When the exciting coil of pole member N12 is energized, the armatures 14 and N14 are attracted by pole member N12 and both swing in counterclockwise direction about their respective pivotal axes. During such movement, the armatures 14, N14 are forced to move at the same angular rate because of the engagement of the arcuate surface 17', 17' of armature N14 with arcuate surfaces 16', 16' of armature 14.

As shown, the sum of the radii of curvature of each pair of engaging surfaces 16', 17' of armatures N14, 14 is equal to the distance between the pivotal axes of these armatures; the radius P–16C is parallel to radius P–17C; and the radius P–C16′ is parallel to the radius P–17′C. Thus, here also there exist the geometrical relationships essential to effecting concurrent angular movements of the armatures N14, 14 when pole N12 is excited. This pair of armatures is also exemplary of two-armature arrangements which although not immune to shock and vibration, have the advantage of efficiently utilizing the available magnetic field.

In the particular arrangement of Fig. 13, the armature 14 is in effect a dual armature common to the two-armature pairs 14, N14 and 14, 14N respectively responsive to the magnetic attraction of poles 12N, N12. When either of the poles 12N, N12 is excited, two of the armatures are moved by the magnetic attraction of the excited pole and the third armature is physically forced to move in the same angular direction and at the same incremental angular velocity by the interengagement of its arcuate surfaces with those of armature 14. For example, when pole 12N is excited to attract the armatures 14, 14N, the armature N14 is physically forced to move in the same angular direction by engagement of its arcuate surfaces 17′, 17′ with the arcuate surfaces 16′, 16′ of armature 14. Such rotation increases the air gap between the unexcited pole N12 and the armatures N14, 14.

Thus, in absence of any bias in the armature system of Fig. 13, it can be utilized as a two-position system with the poles 12N, N12 alternately energizable to move the armatures (together with any auxiliary contact or valve device), from one to the other of two limiting positions. Alternatively, the armatures may be biased to the intermediate or "off" position shown in Fig. 13 so to provide a three-position system.

Because of the efficiency of conversion of electrical coil input to mechanical torque attained by armature systems utilizing the invention, it is commercially feasible to manufacture miniature relays reliably operable with low input. For example, a relay similar to Figs. 9A, 9B and having overall dimensions of about 5/16″ × 3/4″ × 3/4″ required only 0.4 watt for actuating two double-pole double-throw switches.

In all of the arrangements herein shown, the movement of the armatures may be transmitted to pawl and ratchet mechanism which steps a switch or other device to successive control positions.

It shall be understood the invention is not limited to the specific arrangements shown and described and that changes and modifications may be made within the scope of the appended claims.

What is claimed is:

1. An electromagnetic device including magnetizable core structure and an exciting coil therefor, and an armature system comprising at least two armatures pivotally mounted for angular movement in the same direction about their respective pivotal axes upon excitation of said coil, each of said armatures having curved surfaces respectively engageable with a curved surface of an adjacent armature, the algebraic sum of the radii of each pair of said curved surfaces at each point of their successive points of engagement being substantially equal to the distance between the pivotal axes of their corresponding armatures.

2. An electromagnetic device as in claim 1 in which the armatures are of similar configuration, in which the centers of curvature of said arcuate surfaces of each armature lie on a circle having its center at the pivotal axis of the armature, and in which the angular spacing of said centers of curvature is substantially equal to $$\frac{360°}{n}$$

where $n$ is the number of pivotal axes.

3. An electromagnetic device as in claim 1 in which the said engageable surfaces of adjacent armatures are both convex, the arithmetic sum of the radii of curvature of said surfaces being substantially equal to the distance between the pivotal axes of said armatures.

4. An electromagnetic device as in claim 1 in which the said engageable surfaces of adjacent armatures are respectively concave and convex, the arithmetic difference of the radii of curvature of said surfaces being substantially equal to the distance between the pivotal axes of said armatures.

5. An electromagnetic device including a magnetizable core member and an exciting winding therefor, and two armatures of similar configuration pivotally mounted for angular movement in the same direction about their respective pivotal axes toward one pole end of said core member upon excitation thereof, each of said armatures having two arcuate surfaces respectively on opposite sides of its pivotal axis and respectively engageable with the two arcuate surfaces of the other armature, the algebraic sum of the radii of curvature of the engageable arcuate surfaces of the armatures being substantially equal to the distance between their pivotal axes.

6. An electromagnetic device as in claim 5 in which both of said arcuate surfaces of each of the two armatures are convex, the arithmetic sum of the radii of the engageable arcuate surfaces of the armatures being equal to the distance between their pivotal axes.

7. An electromagnetic device as in claim 5 in which the arcuate surfaces of each of the two armatures are respectively concave and convex, the arithmetic difference of the radii of the engageable arcuate surfaces of the armatures being equal to the distance between their pivotal axes.

8. An electromagnetic device as in claim 5 which additionally includes stationary magnetic structure spaced from said pole end of the core member, and in which each of said armatures has an opening through which said core member extends, said armatures being superimposed and each having two portions respectively bounding opposite sides of the corresponding armature opening and respectively attracted to said pole end of the core member and to said stationary magnetic structure upon excitation thereof.

9. An electromagnetic device including a magnetizable core member and an exciting winding therefor, and an armature system comprising at least two armatures pivotally mounted for angular movement in the same direction toward said core member upon magnetization thereof, each of said armatures having curved surfaces respectively engageable with a curved surface of an adjacent armature, the algebraic sum of the radii of each pair of said curved surfaces at their points of successive engagement being substantially equal to the distance between the pivotal axes of their corresponding armatures.

10. An electromagnetic device as in claim 9 in which said armatures have pole-opposing faces shaped to conform with the periphery of the pole end of the core member and jointly embrace the major portion of said periphery.

11. An electromagnetic device as in claim 9 additionally including stationary magnetic structure extending from the other pole end of said core member and with free portions spaced from said one pole end of said core member, and in which said armatures are respectively in proximity to different free portions of said stationary magnetic structure so to provide return paths of low reluctance for the magnetic flux of said core member.

12. An electromagnetic device as in claim 9 in which each of said armatures includes two armature sections respectively attracted by the opposite pole ends of said core member and interconnected by a bridging section serving as a return path for the magnetic flux of said core member.

13. An electromagnetic device comprising at least two armatures having spaced pivotal axes and each having two arcuate surfaces respectively engaged by one of said arcuate surfaces of an adjacent armature, the algebraic sum of the engaging arcuate surfaces of adjacent armatures being substantially equal to the distance between the pivotal axes of the adjacent armatures, a winding, stationary magnetizable structure including a pole member disposed between said armatures and effective during energization of said winding to effect concurrent angular movement of said armatures in one direction, and means for applying a restoring force to effect concurrent movement of said armatures in reverse angular direction, said engaging arcuate surfaces of said armatures constraining them all to move at substantially the same angular velocity during their aforesaid movement in each of said directions.

14. An electromagnetic device as in claim 13 in which all of said armatures are of similar configuration and jointly embrace the major portion of the periphery of said pole member, and in which for each armature the centers of curvature of its arcuate surfaces lie on a circle having its center at the pivotal axis of the armature.

15. An electromagnetic device as in claim 13 in which said stationary magnetizable structure includes portions respectively adjacent said armatures to provide low reluctance return paths for the magnetic flux from said pole member to the respective armatures.

16. An electromagnetic device including a magnetizable core member and an exciting winding therefor, mounting structure for said core member, a pair of armatures, and a U-shaped spring extending through said armatures and said mounting structure to provide pivots for said armatures and having the free ends of its legs respectively attached to said armatures to bias them away from said core member, said armatures each having curved surfaces respectively engageable with a curved surface of the other armature, the algebraic sum of the radii of each pair of said curved surfaces at each successive point of their engagement being substantially equal to the center-to-center spacing of the legs of said U-shaped spring to insure substantially equal rates of pivotal movement of said armatures when attracted toward said core member and when restored by said spring to their unattracted positions.

References Cited in the file of this patent

UNITED STATES PATENTS

| | | |
|---|---|---|
| 2,353,377 | Vaughn | July 11, 1944 |
| 2,361,808 | Ayers | Oct. 31, 1944 |
| 2,474,742 | Kuhn | June 28, 1949 |